(12) United States Patent
Haseloh et al.

(10) Patent No.: US 6,824,093 B1
(45) Date of Patent: Nov. 30, 2004

(54) METHOD OF CONTROLLING PITCH ON A GYROPLANE AND A GYROPLANE

(75) Inventors: Peter G. Haseloh, Kindersley (CA); Duane N. Hunn, Sr., Saginaw, MI (US)

(73) Assignee: Rotary Air Force Management Inc., Kindersley (CA)

( * ) Notice: Subject to any disclaimer, the term of this patent is extended or adjusted under 35 U.S.C. 154(b) by 0 days.

(21) Appl. No.: 10/742,334

(22) Filed: Dec. 18, 2003

(30) Foreign Application Priority Data

Jun. 3, 2003 (CA) ............................................. 2430727

(51) Int. Cl.$^7$ ............................................. B64C 27/22
(52) U.S. Cl. ..................... 244/8; 244/17.11; 244/17.27; 446/36
(58) Field of Search ................. 244/8, 17.11, 17.27, 244/35 R; 446/36; 416/147, 148

(56) References Cited

U.S. PATENT DOCUMENTS

| | | | |
|---|---|---|---|
| 2,940,526 A | * 6/1960 | Vongerichten | 416/18 |
| 3,563,496 A | 2/1971 | Zuck | 244/7 |
| 4,653,705 A | * 3/1987 | Bensen | 244/17.11 |
| 4,741,672 A | * 5/1988 | Breuner | 416/148 |
| 4,928,907 A | 5/1990 | Zuck | 244/6 |
| 5,098,033 A | 3/1992 | Haseloh et al. | 244/8 |
| 5,381,988 A | * 1/1995 | Kattas | 244/153 A |
| 5,727,754 A | 3/1998 | Carter, Jr. | 244/8 |
| 5,758,844 A | 6/1998 | Cummings | 244/7 |
| 5,863,013 A | 1/1999 | Schmittle | 244/48 |
| 5,865,399 A | * 2/1999 | Carter, Jr. | 244/54 |
| 6,435,453 B1 | 8/2002 | Carter, Jr. | 244/8 |

FOREIGN PATENT DOCUMENTS

CA 1324366 11/1993 ................. 244/15

* cited by examiner

*Primary Examiner*—J. Woodrow Eldred
(74) *Attorney, Agent, or Firm*—Christensen O'Connor Johnson Kindness PLLC

(57) ABSTRACT

A method of controlling pitch on a gyroplane. A first step involves pivotally securing a wing to a mast supporting a rotor of the gyroplane. A second step involves providing a linkage between the wing and a rotor head. The linkage is secured to the rotor head with a universal joint connection so as not to restrict movement of the rotor head while maintaining a constant relationship between the wing and the rotor. A third step involves providing controls for a pilot to lengthen and shorten the linkage while in flight in order to pivot the wing and thereby alter positioning of the wing relative to the rotor to help control the angle of the rotor relative to wind direction.

4 Claims, 2 Drawing Sheets

METHOD OF CONTROLLING PITCH ON A GYROPLANE AND A GYROPLANE

FIELD OF THE INVENTION

The present invention relates to a method of controlling pitch on a gyroplane and a gyroplane which has been modified in accordance with the teachings of the method.

BACKGROUND OF THE INVENTION

Gyroplanes are designed with a main keel tube or fuselage to which a mast is attached. On a pusher type gyroplane, the pilot is seated just in front of the mast and the engine is attached to the rear of the mast. On a tractor type gyroplane, the pilot is seated just behind or under the mast and the engine is attached to the front of the fuselage or keel tube. At the top of the mast is a rotor head, which is attached to the mast via a gimbaled head. The gimbaled head (universal joint) is controlled by the pilot via a series of push-tubes leading down to a vertical stick between the pilot's legs. When the pilot pushes forward on the stick the rotor head tilts forward, and the reverse is true when the pilot pulls the stick to the rear. The pilot can also tilt the gimbaled rotor head to the left and to the right by moving the stick in the appropriate direction. The rotors on 90% of all gyroplanes are of the fixed pitch under-slung, teetering type. By tilting the rotor to the relative airflow the rotors will pick up enough speed to form a disc. This is essentially the wing that the gyroplane flies on. By tilting the disc forward the aircraft will descend, and by tilting the disc rearward the aircraft will ascend.

When the pilot moves the stick in the gyroplane he is tilting the entire disc in the direction that he wants to go. If you calculate the sq. ft of a 30 foot rotor disc. it comes out to 706 sq. feet. So the end result is that you have 706 sq. feet of elevator, and 706 sq. feet of aileron. Thus only a small control input is needed to do dramatic things. The pilot is flying the rotor disc, and the main body of the aircraft is like a pendulum below. So when the pilot moves the stick, there is a slight delay in actual movement of the body of the aircraft, relative to the disc. Thus in turbulent air the pilots concentration is a must. Also, the faster the forward speed of the gyroplane the smaller the control inputs are needed. This can lead to a pilot porpoising, which is a where the pilot gets out of phase with what the body of the aircraft is doing relative to the rotor disc. This can lead to the disc tilting to far forward to the relative airflow, causing fatal results. Air movement on a gyroplane rotor blade must be from the bottom out through the top. This air movement will keep the rotor in a steady state of auto-rotation. If the rotor disc is tilted too far forward to the relative wind, the airflow will reverse from the bottom through the top to the top out the bottom. All gyroplanes are more pitch sensitive than roll sensitive, this is to say that the aircraft pendulums more front to rear than side to side.

Previously, the way to counteract the pitch movement of the airframe was to put a horizontal stabilizer at the rear of the gyroplane close to the rudder. It was soon found that a very large span of horizontal tail surface was required to counter the pendulum movement of the airframe. Because the rotor tilts rearward, This limits the distance that the rudder and horizontal tail can be placed to the rear of the aircraft.

Furthermore, by adding the horizontal stabilizer to the keel, the gyroplane can be prevented from pitching up, however, it cannot climb as well. It then becomes very difficult to get climb or turn performance, more stick pressure is required to get the gyroplane to climb or turn. It was discovered that the horizontal tail, if not placed in the propeller slipstream did not actually stop the aircraft from pitching nose up or nose down in turbulent air, it sometimes made it more dramatic.

It was also found that by adding a horizontal tail, that the aircraft's performance was dramatically reduced. When landing, the horizontal stabilizer makes the gyroplane float longer, cutting 30% off the performance of the gyroplane.

SUMMARY OF THE INVENTION

What is required is an alternative method of controlling pitch on a gyroplane.

According to one aspect of the present invention there is provided a method of controlling pitch on a gyroplane. A first step involves pivotally securing a wing to a mast supporting a rotor of the gyroplane. A second step involves providing a linkage between the wing and a rotor head. The linkage is secured to the rotor head with a universal joint connection so as not to restrict movement of the rotor head while maintaining a constant relationship between the wing and the rotor. A third step involves providing means for a pilot to lengthen and shorten the linkage while in flight in order to pivot the wing and thereby alter positioning of the wing relative to the rotor to help control the angle of the rotor relative to wind direction.

According to another aspect of the present invention there is provided a gyroplane which, includes an airframe and an upright mast extending from the airframe and supporting a gimballed rotor head on which a rotor is mounted. An engine is secured to the airframe and adapted to drive a propeller and momentarily drive rotor. A wing is pivotally secured to the mast. A linkage extends between the wing and the rotor head. The linkage is secured to the rotor head with a universal joint connection so as not to restrict movement of the rotor head while maintaining a constant relationship between the wing and the rotor. Means are provided for a pilot to lengthen and shorten the linkage while in flight, in order to pivot the wing and thereby alter positioning of the wing relative to the rotor to help control the angle of the rotor relative to wind direction.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
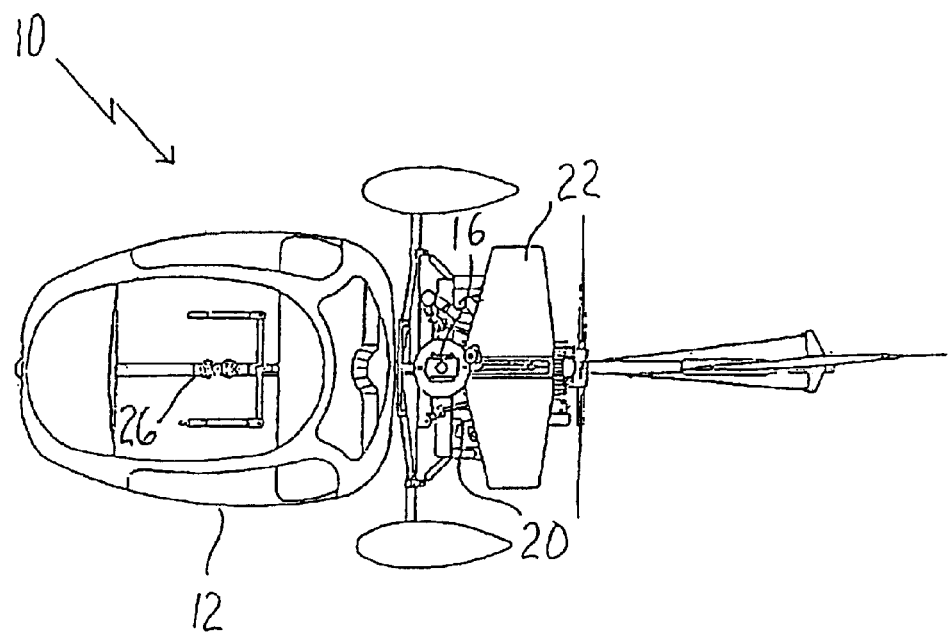
FIG. 1 is a top plan view of a gyroplane constructed in accordance with the teachings of the present invention.

The preferred embodiment, a gyroplane generally identified by reference numeral 10, will now be described with reference to FIGS. 1 through 4.

Structure and Relationship of Parts

Figure 2:
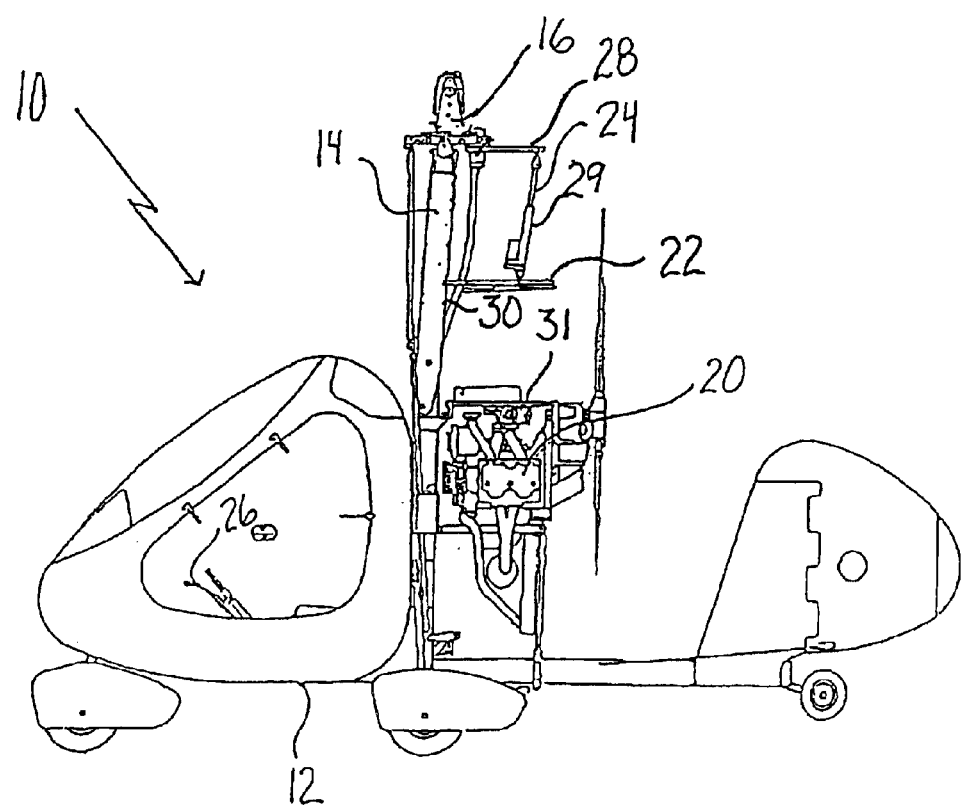
FIG. 2 is a side elevation view of the gyroplane illustrated in FIG. 1.
Figure 3:
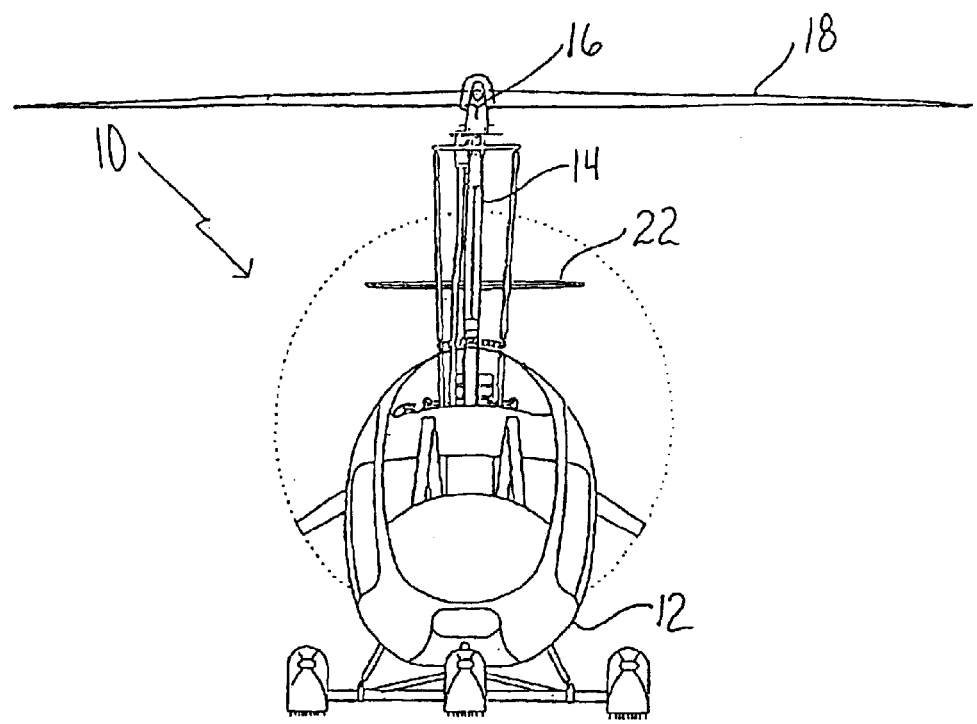
FIG. 3 is a front elevation view of the gyroplane illustrated in FIG. 1.
Figure 4:
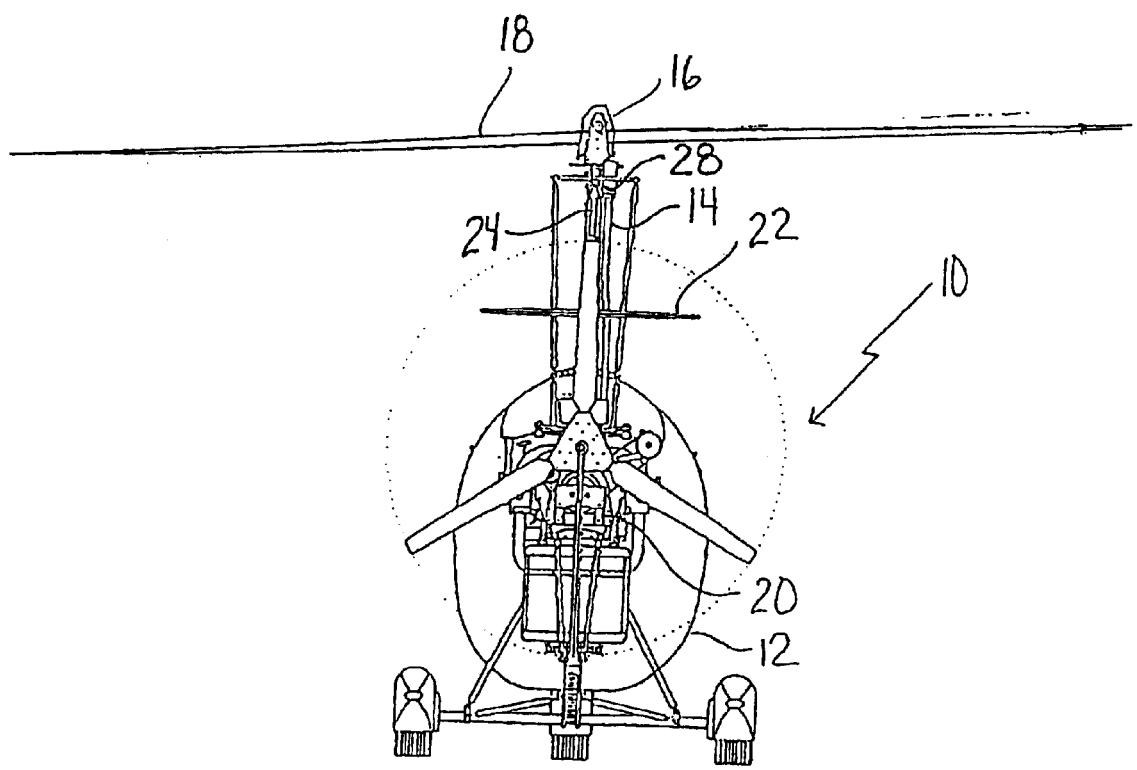
FIG. 4 is a rear elevation view of the gyroplane illustrated in FIG. 1.

Referring to FIG. 1, there is provided a gyroplane 10 which includes an airframe 12. Referring to FIG. 3, an upright mast 14 extends from airframe 12 and supports a gimballed rotor head 16 on which a rotor 18 is mounted. Referring to FIG. 2, an engine 20 is secured to airframe 12 and is adapted to drive propeller and momentarily drive rotor 18. A wing 22 pivotally secured to mast 14. A linkage 24 extends between wing 22 and rotor head 16. In the illustrated embodiment, linkage 24 is electrically activated, although other means could also be used. Linkage 24 is secured to rotor head 16 with a universal joint connection 28 so as not to restrict movement of rotor head 16 while maintaining a constant relationship between wing 22 and rotor 18. An actuator 29 is provided for a pilot to lengthen and shorten linkage 24 while in flight in order to pivot wing 22 and thereby alter positioning of wing 22 relative to rotor 18 to help control the angle of rotor 18 relative to wind direction. Referring to FIG. 4, wing 22 is secured to mast 14 at an approximate midpoint between engine 20 and rotor 18, so as to reduce exposure of wing 22 to turbulent air off airframe 12.

Referring to FIGS. 1 through 4, there is illustrated a method of controlling pitch on gyroplane 10 which includes pivotally securing wing 22 to mast 14 that supports rotor 18 of gyroplane 10. Linkage 24 is provided between wing 22 and rotor head 16 as described above. Linkage 24 secured to rotor head 16 with universal joint connection 28 so as not to restrict movement of rotor head 16 while maintaining a constant relationship between wing 22 and rotor 18.

Referring to FIG. 2, actuator 29 is provided to allow for a pilot to lengthen and shorten linkage 24 while in flight in order to pivot wing 22 and thereby alter positioning of wing 22 relative to rotor 18 to help control the angle of rotor 18 relative to wind direction. As described above, wing 22 is secured to mast 14 at an approximate midpoint 30 between the top 31 of engine 20 and rotor 18, so as to reduce exposure of wing 22 to turbulent air off airframe 12 of gyroplane 10.

Operation

Referring to FIGS. 1 through 4, the use and operation of the gyroplane 10 will now be described. Referring to FIG. 2, actuator 29 allows for a pilot to lengthen and shorten linkage 24 while in flight in order to pivot wing 22 and thereby alter positioning of wing 22 relative to rotor 18 to help control the angle of rotor 18 relative to wind direction. As described above, wing 22 is secured to mast 14 at an approximate midpoint 30 between the top 31 of engine 20 and rotor 18, so as to reduce exposure of wing 22 to turbulent air off airframe 12 of gyroplane 10.

By way of further explanation, a gyroplane is a rotorcraft type of aircraft, which looks somewhat like a helicopter but does not fly the same way. The gyroplane does not blow air down for lift nor does the engine drive the rotorblades as with a helicopter. Rather, it is the relative wind going up through the rotor disc from the bottom to top from forward movement of the gyroplane is what drives the rotorblades.

When the rotor is level to the relative wind, it does not turn. When the joystick is moved from the forward position to the rear of the gyroplane, it increases the angle of attack of the rotor disc and allows the relative wind in under the rotor disc and starts the rotors turning like a fan. When the rotors are up to speed, the relative wind can no longer go through, causing a lot of drag in the direction of the relative wind. To keep from going backwards, power is added or thrust against the wind, which makes the rotors spin faster. By adding more power and moving the joystick forward to lessen the angle of attack of the rotorblades to an angle of approx. 9 degrees to the relative wind, the gyroplane moves forward.

By adding even more power, a pilot can overcome the drag of the rotor disc and because the rotor disc is approx. 9 degrees to the relative wind, it will lift the gyroplane off the ground like a flat rock on water. In the same manner that the leading edge of the flat rock stays up to its direction of travel so that it will stay on top of the water, the gyroplane stays on top of the wind.

The gyroplane flies on the drag of the rotor disc like a kite and the engine overcomes drag with trust. There has to be a balance between thrust and drag. If the angle of attack is too high on the rotor disc, it causes the aircraft to slow down and more power is required to hold altitude. If the angle of attack of the rotor disc is close to flat, it will increase the airspeed. But, if you push the stick too far forward, the angle of attack of the rotor disc will go below the relative wind line and tumble forward. With no drag on the rotor disc, the engine thrust will push the gyroplane over.

The gyroplane is designed to be in balance with itself with respect to factors such as thrust, drag of rotors and drag of the pilot and airframe. If there is equal drag, top and bottom, the engine thrust line is placed in the middle of the mast. Because the rotor disc is bigger than the rest of the gyroplane, it causes more drag through the top of the gyroplane itself. The engine will have to go up to equalize the drag. If there is forward stick pressure, which will cause less angle of attack of the rotor disc and results in less drag, then the engine thrust line has to be moved down. This is not practical. So the gyroplane is set up to be in balance to fly at it's cruise speed, a common cruise speed is 70 to 80 m.p.h. airspeed.

Once the gyroplane is set up and balanced, the next factor relates to how the wind affects the gyroplane. In turbulent wind, the rotor disc gets pushed around a little and it is the pilot's job to use the stick to control attitude, roll, and pitch by making small inputs into the controls. This can be accomplished when the rotors are up to speed as they turn into a gyroscope and there is resistance in the control stick. The resulting kinetic energy can be used to help control the gyroplane.

If the thrustline of the propeller is moved down behind the seat and power is added very quickly, the gyroplane will fly pitch up because engine is not in balance with the drag, top and bottom of the gyroplane. The resulting problem is that if the engine is not moved up to centerline balance, the result is a pitchy gyroplane. Each time power is added in too fast, the gyroplane will pitch up and the pilot will need to push the stick forward to try to stop the gyroplane from pitching up. This action upsets the angle of attack of the rotor disc and places the gyroplane out of balance.

A gyroplane has a universal joint just below the rotor disc, which allows the gyroplane to pendulum under the rotor disc. If power is added in a balanced gyroplane, the front of the gyroplane will pendulum nose up for a climb, By pulling the joystick further back, more drag is created on the rotor disc, and more thrust is required to over come this drag.

The proposed solution is to keep the rotor disc steady in the wind by use of a horizontal surface to control the angle of the rotor disc to the relative wind. A small wing is constructed and placed horizontal to the aircraft mid point between the top of the engine and the rotor disc. The wing is placed in such a way as to receive the relative air cleanly without any turbulent air being introduced from the airframe. The front of the wing is attached to the mast and allowed to pivot up and down at the rear. Linkage is placed near the trailing edge of the wing and is attached to the rear of the rotor head. This linkage also has a universal joint at the top, so as not to restrict movement of the gimbaled head. The linkage can be controlled from the pilot's seat so as to change the angular difference between the wing and the rotor disc. When relative wind is passing over the wing surface, the wing will trail in a straight line to the rear and parallel to the relative air. Being connected to the rear of the rotor head, the wing will cause the rotor disc to be stabilized. By changing the angular difference between the wing and the rotor disc, a desired airspeed can be maintained indefinitely. Furthermore, landing and takeoff performance is not hindered.

The same principle can also be used on the trike-type kite aircraft. This type of aircraft is remarkably similar to a gyroplane, in that the aircraft's body pendulum's under a gimbaled head. In this instance, a kite-like wing is attached to the gimbaled head.

There is also application for this above described method with respect to helicopters. By attaching the front of the wing so it moves up and down with the swashplate, and connecting the rear of the wing to the cyclic pitch control, the helicopter would be less sensitive in pitch.

Gyroplanes that utilize articulated rotors like a helicopter could also benefit from this method as well. By attaching the front of the wing so it moves up and down with the swashplate, and connecting the rear of the wing to the cyclic pitch control we believe that the articulated rotor gyroplane would be less sensitive in pitch.

There could also be applications in the field of unmanned aerial vehicles. By making the UAV Gyroplane, UAV Helicopter and UAV Kite less pitch sensitive in the pitch and roll, pilots will be trained much quicker.

Variations

Wing 22 can also be split down the middle chordwise and with the use of two control linkages 24 going to rotor head 16, could facilitate the control of roll oscillations.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A method of controlling pitch on a gyroplane, comprising the step of:
    pivotally securing a wing to a mast supporting a rotor of the gyroplane;
    providing a linkage between the wing and a rotor head, the linkage being secured to the rotor head with a universal joint connection so as not to restrict movement of the rotor head while maintaining a constant relationship between the wing and the rotor;
    providing means for a pilot to lengthen and shorten the linkage while in flight in order to pivot the wing and thereby alter positioning of the wing relative to the rotor to help control the angle of the rotor relative to wind direction.

2. The method as defined in claim 1, the wing being secured to the mast at an approximate midpoint between a top of an engine and the rotor, so as to reduce exposure of the wing to turbulent air off the airframe of the gyroplane.

3. A gyroplane, comprising:
    an airframe;
    an upright mast extending from the airframe and supporting a gimballed rotor head on which a rotor is mounted;
    an engine secured to the airframe and adapted to drive the rotor;
    a wing pivotally secured to the mast;
    a linkage extending between the wing and the rotor head, the linkage being secured to the rotor head with a universal joint connection so as not to restrict movement of the rotor head while maintaining a constant relationship between the wing and the rotor;
    means for a pilot to lengthen and shorten the linkage while in flight in order to pivot the wing and thereby alter positioning of the wing relative to the rotor to help control the angle of the rotor relative to wind direction.

4. The gyroplane as defined in claim 3, wherein the wing is secured to the mast at an approximate midpoint between the engine and the rotor, so as to reduce exposure of the wing to turbulent air off the airframe.

* * * * *